Nov. 13, 1962   B. R. NICHOLS   3,063,672
VALVE
Filed Sept. 8, 1959

Inventor
Beverly R. Nichols
by Arthur M. Strich
Attorney

United States Patent Office 3,063,672
Patented Nov. 13, 1962

3,063,672
VALVE
Beverly R. Nichols, Elm Grove, Wis., assignor to Allis-Chalmers Manufacturing Company, Milwaukee, Wis.
Filed Sept. 8, 1959, Ser. No. 838,577
3 Claims. (Cl. 251—306)

This invention relates to valves and more particularly to an arrangement for clamping a seat made of resilient material in the bore of a valve body. This resilient seat provides a seal for a movable body within the bore of the housing when the body is in a position to block the flow of fluid through the housing.

A valve, such as for example a butterfly valve, requires a seat of resilient material interposed between the valve housing and the movable valve body called a disk, in order to provide a fluid tight seal when the disk is in position to block the flow of fluid through the valve housing. When a butterfly valve disk is turned toward its closed position the disk engages the resilient seat slightly before the disk reaches its fully closed position. This is necessary so that in a completely closed position the disk compresses the resilient seat slightly and thereby insures contact around the entire periphery of the disk to insure a fluid tight seal. However, from the instant of first contact between the disk and the resilient seat and until the disk reaches its fully closed position, there is a brief period of time during which the movement of the disk tends to push the valve seat along with it rather than seating itself firmly in the resilient material. To provide an effective seal therefore the seat must be securely held within the bore of the valve housing. One way to do this, of course, would be to in some way bond the seat to the valve housing. This is undesirable in actual practice, however, because it is occasionally necessary to replace the valve seat and bonding the valve seat to the valve housing makes such replacement quite difficult. It is, therefore, much more desirable to provide an arrangement for holding the seat in place within the valve housing that will permit easy removal and replacement of this seat when it becomes necessary to do so. A number of mechanical means have been proposed to hold the valve seat within the housing. However, it has been discovered in many instances that the movement of the disk during that brief period after initial contact with the valve seat, but before the disk reaches its fully closed position, results in a slight wrinkling of the seat and permits water to seep underneath the valve seat and results in leakage past the disk.

It is among the objects of the present invention to provide a valve in which a seat is firmly seecured within the bore of a valve housing; is arranged for easy replacement; will resist any tendency of the valve seat to pull away from the valve housing as the disk moves into closed position; and that effectively eliminates the seeping of water underneath or behind the valve seat to the downstream side of the valve disk.

According to a preferred embodiment of the present invention, a butterfly type valve is provided with a valve seat having a T-shaped cross section. The seat is arranged within the bore of a valve housing with the crown of the T in contact with the valve housing and the shank of the T projecting radially inward to engage the butterfly valve disk when it turns to a closed position. Clamping means are provided to overlap the bore surface and the crown to a position that is substantially abutting against the shank of the seat and actually abuts the shank on the downstream side of the disk when the disk is in its closed position. The clamping means and the valve housing are each provided with teeth for gripping the crown of the seat. The same arrangement may be provided on both sides of the shank of the T. The teeth are arranged so that the teeth in the valve housing are axially spaced from the shank a distance greater than the teeth on the clamping means are spaced from the shank. The purposely misaligned teeth can firmly grasp and bite into the crown of the T-shaped seat to hold it in position without cutting or tearing a resilient material. The invention has been found surprisingly effective to eliminate seepage of liquid behind the seat.

Other objects, features and advantages will be apparent as the description of the invention proceeds with reference to the accompanying drawing, in which.

Figures 1, 2:
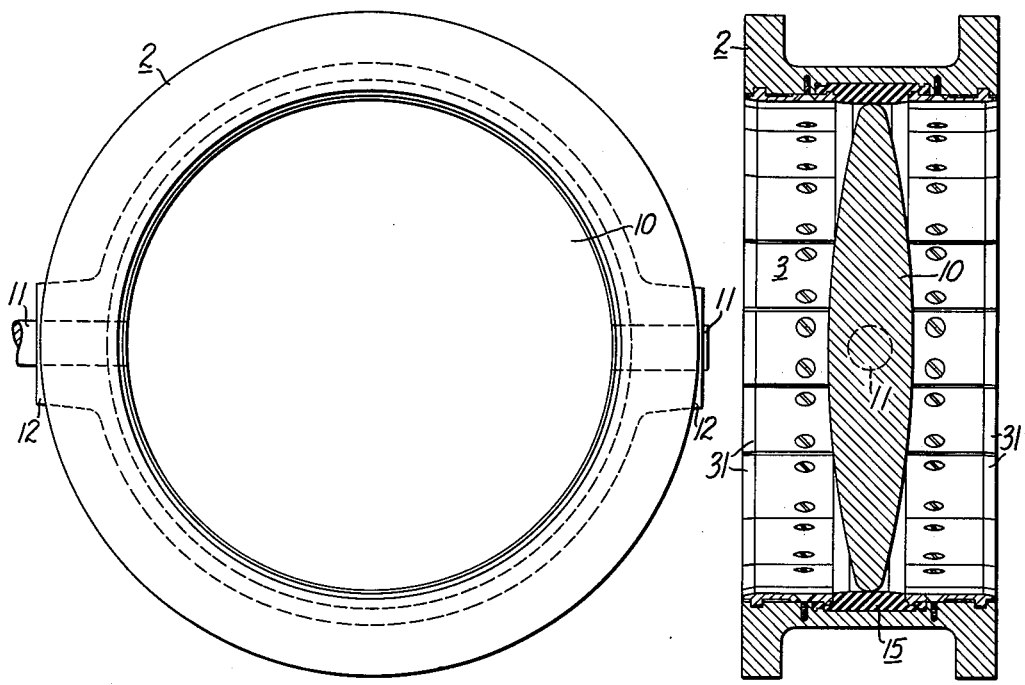
FIG. 1 is a longitudinal section through a butterfly valve.
FIG. 2 is a front elevation of the butterfly valve showing the valve disk in a closed position.

Referring to the drawing, a butterfly valve is disclosed comprising a housing 2 having an annular bore 3 extending through the valve housing. A movable valve body, shown as a disk 10, is mounted within the bore 3 and is movable to a position as shown in FIG. 1 in which the valve disk 10 completely blocks the bore 3 to prevent the flow of fluid through the housing 2. The valve disk 10 is provided with a shaft 11 which passes through journals 12 formed in the valve housing 2. Valve shaft 11 and disk 10 may be rotated by valve operating mechanisms, not shown, that are well known to those skilled in this art and form no part of the present invention. Such valve operating mechanisms may be applied, however, to rotate the disk 10 from a first position in which the disk presents the smallest possible impedance to the flow of fluid through valve housing 2 to a second position as shown in the drawing and in which the disk completely closes the bore 3 within the valve housing 2.

Figure 3:
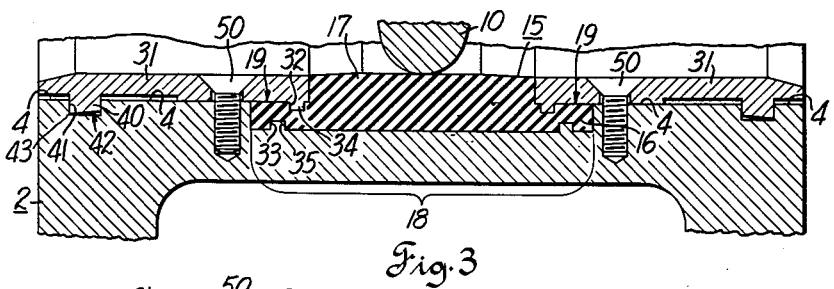
FIG. 3 is an enlarged fragmentary portion of the structure shown in FIG. 1.
Figure 4:
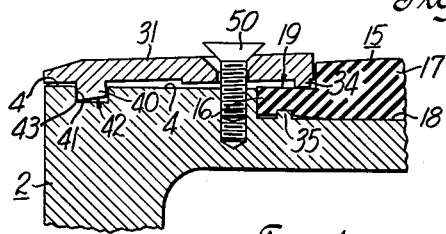
FIG. 4 is a fragmentary portion of FIG. 3 showing the structure at an earlier stage of assembly and in a somewhat modified form.

An annular seat 15 made of a resilient material, such as rubber, is provided in the interior of the bore 3 of the valve housing. This resilient seat 15 provides a seal for disk 10 when disk 10 is in a position to block the flow of fluid through housing 2. The seat 15 is provided with a configuration that presents a generally T-shaped cross section. The T-shaped cross section is shown to enlarged scale, although inverted, in FIG. 3. As shown inverted in FIG. 3, the T comprises a crown 16 crossing a shank 17. The seat 15 is arranged with the crown 16 of the T being in contact with the valve housing 2 and with the shank 17 projecting radially inward to engage the valve disk 10 to provide a fluid tight seal when the valve disk 10 is in a closed position as shown in the drawings. The crown 16 of the seat 15 makes contact with the interior of the valve housing 2 by being fitted in a recess 18 extending radially outward from a main bore surface 4. As shown in FIG. 4, the crown 16 is initially provided with a slightly greater radial thickness than the radial depth of the recess 18 for reasons that will be discussed later in this description.

Clamping means are provided to clamp the seat 15 to the valve housing 2. The same arrangement of clamping means that will be described may be provided on both sides of the shank 17 of the T-shaped seat 15. The clamping means are shown as comprising a plurality of segments 31 arranged in an annular ring with each of the segments overlapping the surface 4 of the bore and the radially inner surface 19 of the crown 16. The segments 31 extend toward the shank 17 approximately to a position in which the segments abut the shank 17 and make actual contact at least on the downstream side when the valve is closed.

The radially inner surface 19 of the crown 16 may be provided with an annular groove 32. The groove 32 defines an annular plane that is perpendicular to the central axis of the bore 3. Likewise the radially outer surface of the crown 16 may be provided with a similar annular groove 33. This annular groove 33 also defines a radial plane that is perpendicular to the central axis of the housing 2. The groove 33 is spaced axially from the shank 17 a distance that is greater than the first groove 32 is spaced from the shank for reasons that will appear as this description proceeds.

An annular tooth 34 projects radially outward of each of the segments 31 and into the groove 32. When all of the segments 31 have been arranged, as shown in FIG. 1, to provide an annular ring of such segments the annular teeth 34 provide a generally continuous annular ridge substantially filling the groove 32. Another tooth 35 formed as an annular ridge projecting radially inward from recess 18 in the housing 2 projects into the groove 33. To provide an even more effective seal, the grooves 32, 33 should be eliminated and teeth 34, 35 should be pressed directly into the crown. This modification is shown in FIG. 4.

A fulcrum 40 projects radially outward from each of the segments 31 and pivotally engages housing 2. An annular groove 41 may be provided in housing 2 to receive the fulcrum 40. The radially outward surface 42 of the fulcrum 40 is tapered slightly to provide contact along an annular line at the axially outboard corner 43 of the groove 41. It is not absolutely necessary that the fulcrum 40 be fitted into a groove in the housing although the construction shown does have an added advantage that will be discussed later. The fulcrum 40 and the tooth 34 are axially spaced a substantial distance apart. The distance between fulcrum 40 and tooth 34 may well be greater than one-half of the axial length of the segment 31.

Means for securing the segments 31 to the housing 2 are shown as screws 50 that connect the segments 31 to the overlapped portion of surface 4 of the bore in the valve housing. The screw 50 does not pass through the crown 16 of the seat 15 but it is located as close as possible to the crown 16. It is desirable that the screw 50 be axially spaced from the fulcrum 40 a greater distance than the screw 50 is from the teeth 34. The reason for this is that the segment 31 is like a beam supported by a pair of axially spaced fulcrums. If a load is placed upon such a beam and concentrated at a point midway between the two fulcrums, the load carried by each fulcrum is the same. However, if the concentrated load is closer to one fulcrum than it is to the other, that fulcrum closest to the load will carry the greater portion of the load. So it is with segment 31. Segment 31 is supported by the fulcrum 40 and tooth 34 and a load is applied by the screw 50 between those two supports. By providing the screw 50 closer to tooth 34 than the fulcrum 40, the greater portion of the load applied by the screw 50 will be applied where it is most needed, that is, to compress and hold the crown 16 between the teeth 34 and 35 to securely hold the seat and prevent liquid seeping beneath the crown of the seat.

Referring to FIG. 4, the segment 31 is shown in a position before the screw 50 has been turned all the way into the housing 2. Note that initially the crown 16 is slightly thicker in a radial direction than the recess 18 is deep. This provides an excess of resilient material that can be compressed to insure the defined space is completely filled with a sealing material. In the position shown in FIG. 4, the segment 31 rests upon the crown 16 and the fulcrum 40. As the screw is turned into the housing 2 the greater portion of the load applied by the screw will be applied where it is most needed, namely, to compress crown 16 and squeeze the crown between the teeth 34, 35. As was previously stated, it is not absolutely necessary that fulcrum 40 be fitted into groove 41 to obtain this action. However, the fact that the fulcrum is placed in such a groove does have an advantage. When the disk of the valve is moving the frictional contact between the disk and the seat provides a force on the trailing portion of the seat having a component in an axial direction away from a segment 31. There is therefore a tendency for the valve seat to pull away from a tooth 34 and exert a force on segment 31 tending to pull the segment 31 inwardly. If the fulcrum 40 is fitted into a groove, such as 41, a portion of the load applied to the segment 31 by such action is carried by the fulcrum 40 rather than the screw 50 carrying this entire load. There may be instances when it is desired to use relatively small screws that would not be large enough themselves to carry this entire load. However, if sufficiently large screws are used, it will not be absolutely necessary to use a groove 41 as shown. When the groove 41 is not provided, the fulcrum 40 may bear directly upon a continuous surface 4.

With the described arrangement, each segment 31 and the housing 2 act as a pair of jaws pivoted at point 43 and drawn together by screw 50 to sink teeth 34, 35 into the crown of the seat to compress and hold the seat in a bitelike grip and thereby accomplish the objects of the invention. The fact that teeth 34, 35 do not lie in the same radial plane provides for compression of the crown from two directions, neither of which is individually enough to cause the resilient material to take a permanent set but yet the total of the two compressive forces provides for a good fluid tight seal.

Although but one valve has been described and relatively few modifications suggested, it will, however, be obvious to those skilled in the art that a number of features have been described that may be singly or collectively embodied in other embodiments than the one illustrated without necessarily departing from the spirit of the invention. Accordingly, the disclosure herein is illustrative only and the invention is not necessarily limited thereto.

Having now particularly described and ascertained the nature of my said invention and the manner in which it is to be performed, I declare that what I claim is:

1. A valve comprising a housing having an annular bore extending therethrough, a valve body pivotally mounted within said bore and movable from an open position to a position to close said bore, a resilient annular seat interposed between said housing and said body, said seat having a generally T-shaped cross section of a crown crossing a shank, said crown of the T being in contact with said housing and said shank projecting radially inward to engage said body and provide a fluid tight seal when said body is in said closed position, clamping means within said bore comprising a plurality of segments arranged in an annular ring with each segment overlapping a portion of the surface of said bore and the radially inner surface of said crown to a position abutting said shank, a tooth projecting radially outward of each of said segments into said crown, a tooth projecting radially inward of said housing into said crown, said housing tooth being spaced axially from said shank a distance greater than said clamping means tooth is axially spaced from said shank, a fulcrum projecting radially outward from each of said segments and engaging said housing and holding said segment from lineal movement relative to said housing, said fulcrum and said segment teeth being axially spaced apart a distance greater than one-half the axial length of said segments, and means securing said segments to said overlapped portion of said bore surface to clamp said seat to said housing with said securing means being axially spaced from said fulcrum a greater distance than said securing means is spaced from said segment teeth.

2. A valve comprising a housing having an annular bore extending therethrough, a valve body mounted within said bore and movable to a position to close said bore, a resilient annular seat interposed between said housing and said body, said seat having a generally T-shaped cross section of a crown crossing a shank, said crown of the T being in contact with said housing and said shank projecting radially inward to engage said body and provide a fluid tight seal when said body is in said closed position, clamping means within said bore comprising a plurality of segments arranged in an annular ring with each segment overlapping a portion of the surface of said bore and the radially inner surface of said crown to a position abutting said shank, a fulcrum projecting radially from each of said segments and engaging said housing, said fulcrum being spaced axially from said shank a distance greater than one-half the axial length of said segments, and means securing said clamping means to said overlapped portion of said bore surface to clamp said ring to said housing with said securing means being axially spaced from said fulcrum a greater distance than said securing means is spaced from said shank, said segments being relieved along their radially outer surfaces from a point adjacent said securing means to the end thereof remote from said resilient annular seat except for said fulcrum.

3. A valve comprising a housing having an annular bore extending therethrough, a valve body pivotally mounted within said bore and movable from an open position to a position to close said bore, a resilient annular seat interposed between said housing and said body, said seat having a generally T-shaped cross section of a crown crossing a shank, said crown of the T being in contact with said housing and said shank projecting radially inward to engage said body and provide a fluid tight seal when said body is in said closed position, clamping means within said bore comprising a plurality of segments arranged in an annular ring with each segment overlapping a portion of the surface of said bore and the radially inner surface of said crown to a position abutting said shank, a tooth projecting radially outward of each of said segments into said crown, a tooth projecting radially inward of said housing into said crown, said housing tooth being spaced axially from said shank a distance greater than said clamping means tooth is axially spaced from said shank, a fulcrum projecting radially between each of said segments and said housing and each engaging a segment and said housing to hold same against relative lineal movement, said fulcrum and said segment teeth being axially spaced apart a distance greater than one-half the axial length of said segments, and means securing said segments to said overlapped portion of said bore surface to clamp said seat to said housing with said securing means being axially spaced from said fulcrum a greater distance than said securing means is spaced from said segment teeth.

References Cited in the file of this patent

UNITED STATES PATENTS

| | | |
|---|---|---|
| 2,240,711 | Miller | May 6, 1941 |
| 2,936,153 | Gaffin | May 10, 1960 |

FOREIGN PATENTS

| | | |
|---|---|---|
| 576,182 | Canada | May 19, 1959 |
| 1,050,622 | Germany | Feb. 12, 1959 |